United States Patent [19]

Lovich et al.

[11] 3,926,243
[45] Dec. 16, 1975

[54] CARGO CONTAINER LATCHES

[75] Inventors: John W. Lovich; Oscar W. Meller, both of Akron, Ohio; Walter F. Sprick, Phoenix, Ariz.

[73] Assignee: Goodyear Aerospace Corporation, Akron, Ohio

[22] Filed: Feb. 11, 1974

[21] Appl. No.: 441,616

[52] U.S. Cl. ............... 160/328; 160/181; 292/148; 220/1.5
[51] Int. Cl.[2] ................... A47H 23/00; E05C 1/04
[58] Field of Search .......... 160/130, 181, 264, 290, 160/326, 368, 369; 220/1.5, 24, 41; 135/14 D; 52/63; 105/332; 292/50, 148; 296/50

[56] References Cited
UNITED STATES PATENTS

| | | | |
|---|---|---|---|
| 2,089,876 | 8/1937 | Cavedo | 160/290 |
| 2,415,200 | 2/1947 | Willett et al. | 160/328 |
| 2,502,665 | 4/1950 | O'Drago | 160/328 |
| 3,292,685 | 12/1966 | Clark | 160/264 |
| 3,356,127 | 12/1967 | Herrera | 160/181 |
| 3,485,406 | 12/1969 | Borden | 220/1.5 |
| 3,752,520 | 8/1973 | Sprick et al. | 292/148 |

*Primary Examiner*—Paul R. Gilliam
*Assistant Examiner*—Victor N. Sakran
*Attorney, Agent, or Firm*—Oldham & Oldham

[57] ABSTRACT

Disclosed is a unique assembly of latches to be used in association with a fabric door of a cargo container. A first set of latches of the button and key slot type are presented in spaced relationship with the buttons fixedly attached to a shelf or framework of the cargo container and the key slots fixedly attached to a reinforcing bar traversing the fabric door. By appropriately positioning the reinforcing bar with respect to the buttons all of the button-key slot engagements may be actuated simultaneouly along the entire length of the shelf. The bottom of the fabric door has a bar attached thereto, the bar having a tongue protruding therefrom. A groove is presented in the framework of the cargo container such that a tongue and groove engagement may be made along the base. Latches at each end of the bottom bar engage with the framework of the container so as to maintain the tongue and groove engagement at the base.

10 Claims, 10 Drawing Figures

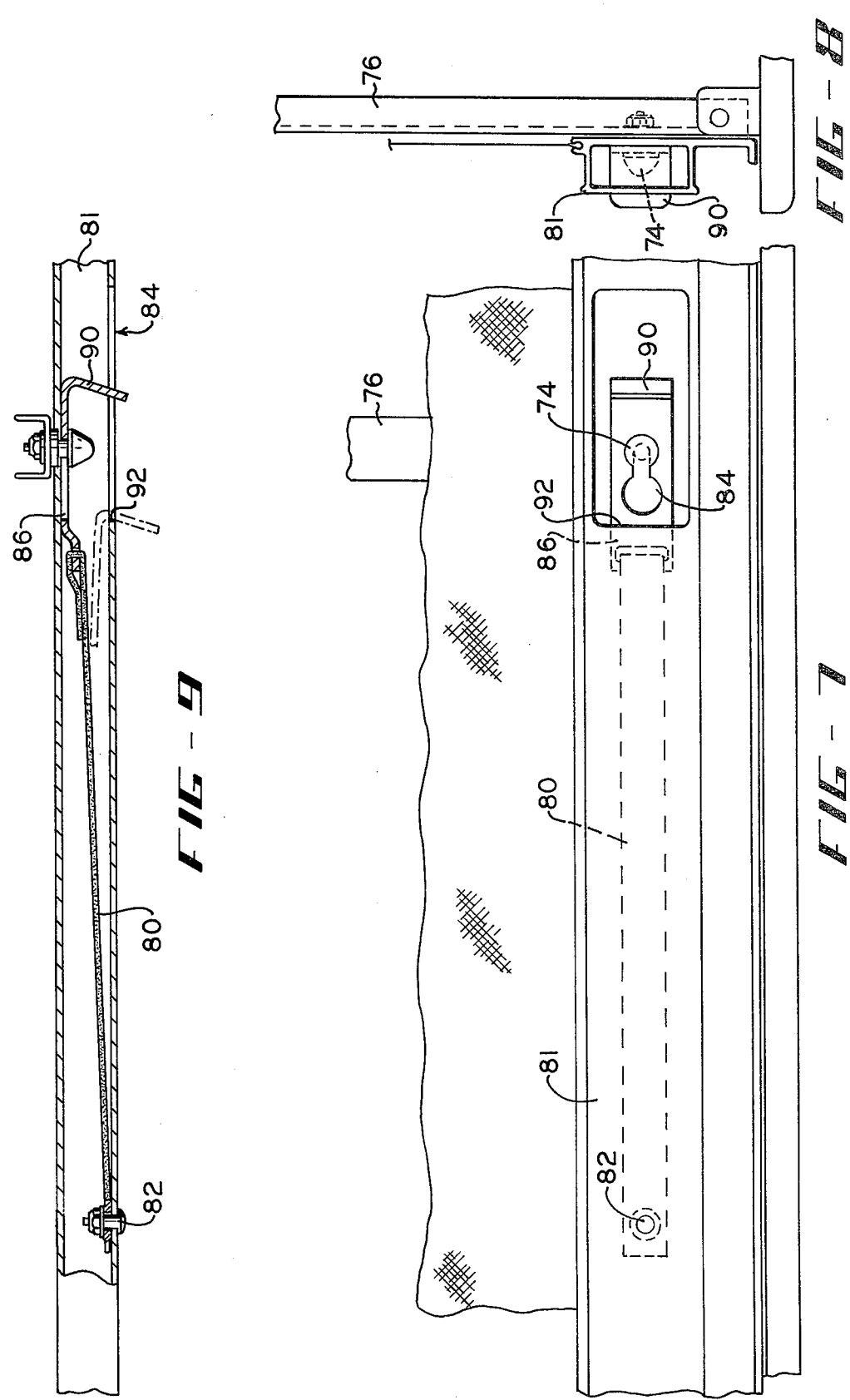

3,926,243

CARGO CONTAINER LATCHES

BACKGROUND OF THE INVENTION

Heretofore various types of cargo containers have been utilized in the transportation industry. Many of these cargo containers have a fabric door allowing access to the interior thereof. The fabric door is such that it must be affixed to the framework of the cargo container by individually engaging a plurality of securing means along the periphery of the door framework. In order to prevent abnormal stretching of the fabric door by forces exerted by shifting loads, securing means have often been provided along the horizontal shelves of the cargo container so that the fabric door might be affixed thereto. In many known cargo containers as many as fourteen individual securing means are provided with the fabric door thus requiring fourteen separate and distinct securing actions by the user. Such assemblies require an unnecessary redundancy of operations and many times such operations are not performed by operators who, in their hurry, fail to secure all of the latches.

Consequently, it is an object of the instant invention to present latches for association with the fabric door of a cargo container whereby a plurality of latches may be simultaneously engaged by one operation.

A further object of the invention is to present latches for utilization with fabric doors of cargo containers which, when engaged, apply tension to the fabric door so as to better withstand the forces imparted thereto by shifting cargo.

Yet another object of the invention is to present latches for securing the fabric doors of cargo containers which are simplistic in design, inexpensive in cost, secure in operation, and easily actuated by an operator.

These objects and other objects which will become apparent as the detailed description proceeds are achieved by a latch system for use on a cargo container having a framework, base, and a fabric door for closing an opening and allowing access to the interior thereof, comprising a first rigid member connected to and horizontally traversing the fabric door; a plurality of first latch assemblies connected to and spaced along the first rigid member; a second rigid member connected to and horizontally traversing the fabric door at the bottom thereof; and a plurality of second and third latch assemblies connected to the second rigid member, the second latch assemblies securing the positioning of the fabric door over the opening and the third latch assemblies maintaining the engagement of the second latch assemblies.

For a complete understanding of the structure and techniques of the invention reference should be had to the detailed description and accompanying drawings wherein.

Figure 6:
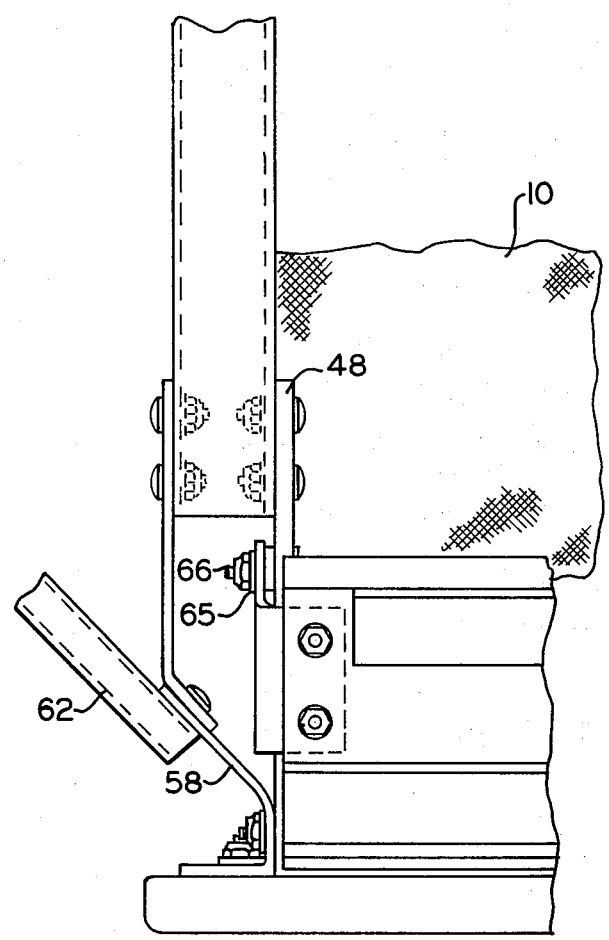
Figure 4:
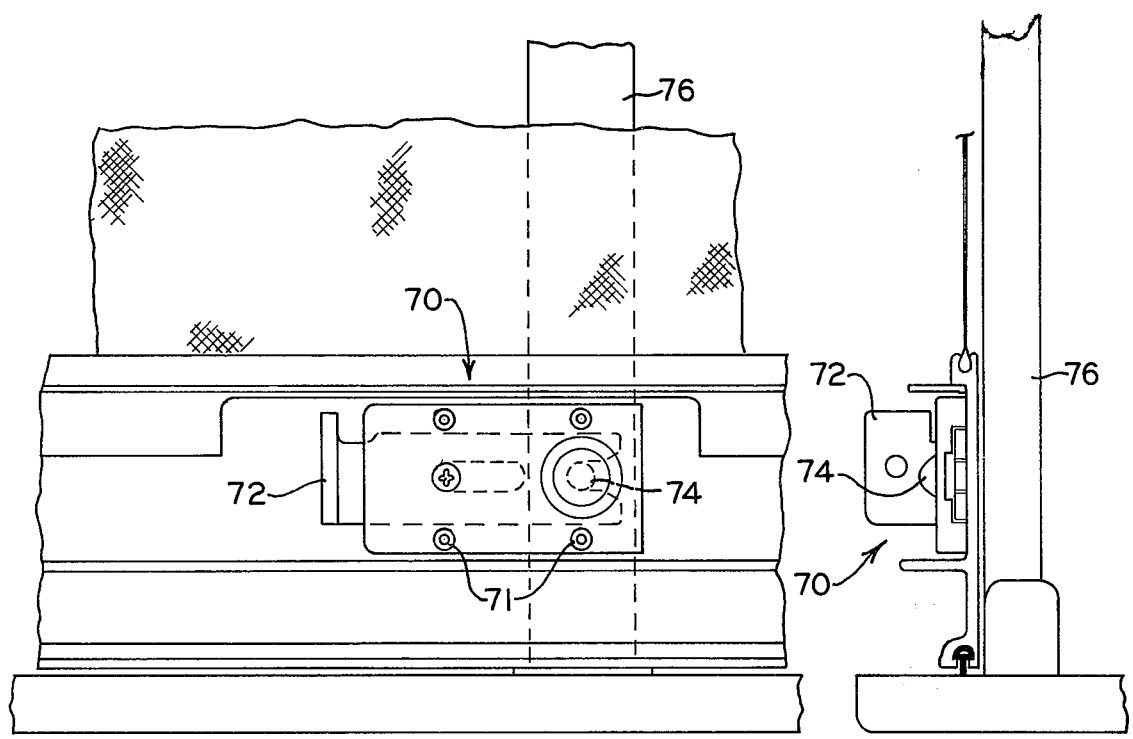
Figure 5:
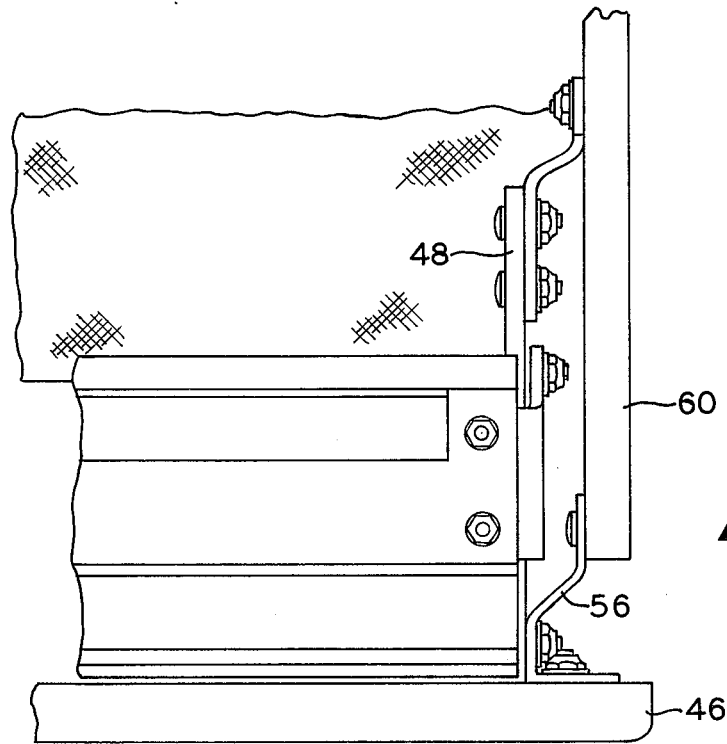

FIGS. 4A and 4B respectively present front and side views of the slide latch assembly utilized in the combination of the invention;

FIGS. 5 and 6 are front views of the right and left ends of the lower door beam latches respectively;

FIG. 7 is a front view of an alternate assembly which might be used in place of the slide latch of FIG. 4;

FIG. 8 is a side view of the latch of FIG. 7 showing the engagement thereof; and FIG. 9 is a cross sectional view of the latch assembly of FIG. 7.

Figure 1:
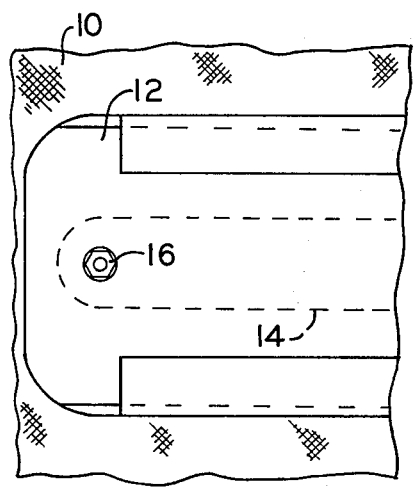
FIG. 1 is a broken frontal view of the upper beam and latch assembly connected to the fabric door.

Referring now to the drawings and more particularly FIG. 1, the fabric door 10 may be seen having attached thereto an upper door beam 12. The fabric of the fabric door 10 may be of any suitable nature in accordance with the teachings of the state of the art. As is further well known in the art, the fabric door 10 is affixed to the header of the cargo container upon which it is used by appropriate securing means which may include a bead and groove engagement therewith which will be discussed hereinafter in relation to the engagement of the fabric door 10 with the lower door beam. The upper door beam 12 may of course be of any suitable nature but is preferably of an aluminum channel construction as shown in the side view of FIG. 2. The upper door beam 12 is fixedly attached external to the fabric door 10 by means of a plurality of retainers 14 connected to the beam 12 by nut and screw attachments indicated at 16; the fabric door 10 being interposed between the beam 12 and the retainers 14.

Linearly spaced along the beam 12 between the retainers 14 are a plurality of keyhole plates 18. The keyhole plates 18 are fixedly attached to the beam 12 by the screw and nut engagements 20. Preferably, the plates 18 are mounted so as to interpose the fabric 10 between the plates and the beam 12 in securing engagement. Keyhole slots 22 are present in the plates 18 and align with similar keyhole slots within the beam 12. Of course, the fabric of the fabric door 10 is also removed in the keyhole area so as to present a complete passageway therethrough. The keyhole passageway through the beam 12 may be somewhat larger than that through the plate 18 to allow for adjustments of the plate 18 within a preselected tolerance to guarantee alignment with the buttons to be described hereinafter.

Figure 2:
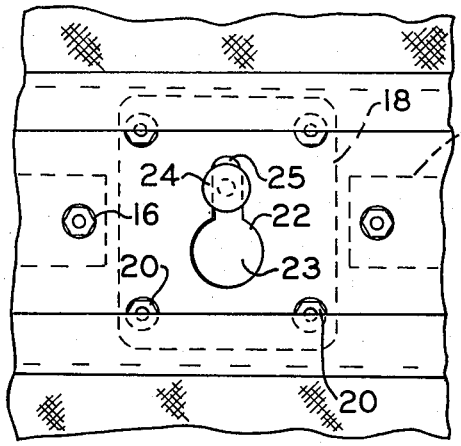
FIG. 2 is a side view of the upper beam showing the engagement of the button and keyhole latch mechanism.
Figure 2:
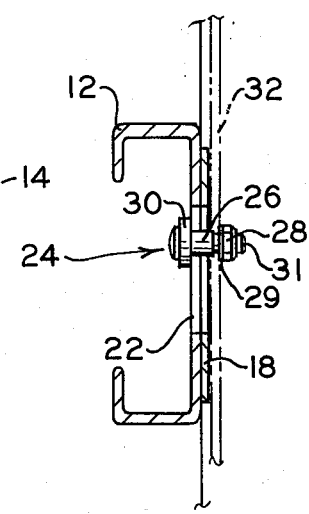

As can be seen in FIG. 2, a button assembly 24 is fixedly attached to a vertical beam 32 of the cargo container between a spacer 26 and a washer 29. The spacer 26 is fixedly attached to a bolt 31 and a nut 28 threaded thereon achieves the requisite attachment of the button assembly 24 to the beam 32. It will of course be understood that the button assembly 24 need not be attached to vertical or horizontal beams within the cargo container but may well be positioned along the front edge of a shelf positioned within the cargo container, the front edge of the shelf being flush with the front of the container. A head 30 is of such size and nature as to readily pass through the hole 23 of the keyhole slot 22 but of such a large diameter as to not slip through the slots 25 thereof. Of course, the spacer 26 is of such diameter as to snugly engage with the edges of the slot 25 in the normal button and keyhole latching engagement.

According to the teachings of the invention, a plurality of button assemblies 24 are provided in spaced horizontal relationship along the front edge of a cargo container shelf or in attachment with a plurality of vertical beams 32 as shown in FIG. 2. The plates 18 attached to the upper door beam 12 are in a similar horizontal spaced relationship. The beam 12 is attached to the fabric door 10 in such a nature that when the plurality of button and keyhole latching engagements are made the fabric of the fabric door 10 between the beam 12 and the header of the cargo container is fully extended with a slight tension being present therein. It should be readily appreciated that by spacing the plates 18 with the keyhole slots 22 therein in the same manner as the spacing of the button assemblies 24, an operator may actuate all such aligned button and keyhole latches in one simple operation. Thus, the requirement of individual actuations of a plurality of such latches is alleviated.

Figure 3:
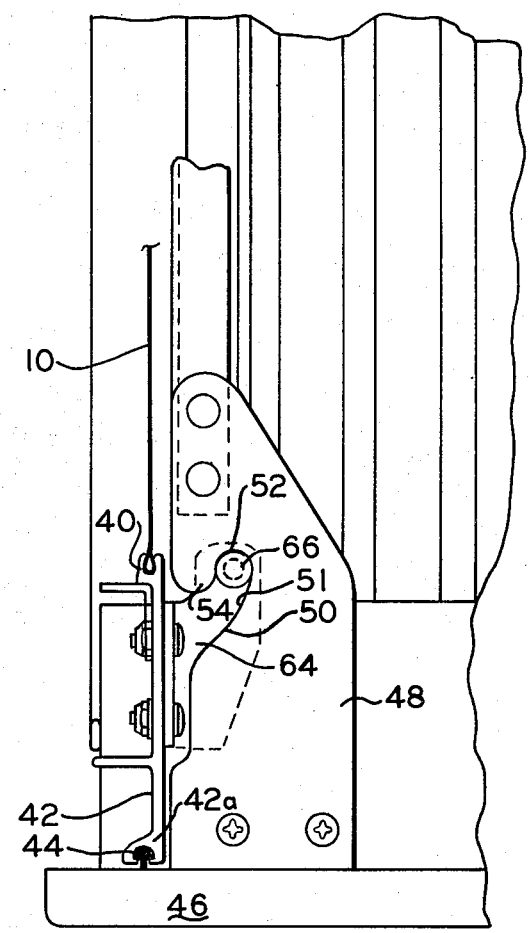
FIG. 3 is a side view of the lower door beam latch assembly showing the engagement thereof.

Referring now to FIGS. 3, 5 and 6 an understanding of the latching engagement of the lower beam 42 may be had. Here it can be seen that the fabric door 10 is fixedly attached to the lower beam 42 by the bead and groove engagement shown at 40. This bead and groove engagement is similar in nature to that by which the fabric door 10 is connected to the header of the cargo container. Such engagement is of course well known and understood in the art. The lower beam 42 contains at the bottom thereof a rubber weatherseal 44 which makes sealing engagement with the base 46 of the cargo container. The rubber seal 44 is contained within a grooved extrusion within the toe 42a of the beam 42. Connected to the base 46 at each end thereof is a plate 48 characterized by the presence of a cavity 50 therein. The cavity 50 is open toward the front of the cargo container and has a recess 52 at the top thereof behind an overhanging lip 54. As can be seen, the cavity 50 is angled upwardly along an incline 51. The plate 48 may be fixedly attached to the base 46 by any appropriate means, depending upon the particular nature of the cargo container involved. As is shown in FIGS. 5 and 6 appropriate angle elements 56 and 58 may be utilized. As should be readily apparent to one skilled in the art, the element 60 constitutes the vertical end panel of a standard cargo container while the element 62 comprises that end panel along the trapezoidal end section present on many cargo containers.

Attached to the lower beam 42 at points operatively opposite the plates 48 are arcuate tongues or curvilinear plate members 64. A stud or roller 66 is appropriately connected to the top of the members 64 by the bolt and nut engagement shown at 65.

With the button and keyhole latch engagements already made as discussed hereinabove, the operator utilizing the cargo container may now grasp the lower beam 42, which may be an extruded aluminum member, and pull the fabric door 10 downwardly so as to cause the stud or roller 66 at the ends of the arcuate member 64 to engage with the incline 51 of the cavity 50. By then pushing the beam 42 inwardly towards the interior of the cargo container the stud or roller 66 may be caused to slide or roll upwardly within the cavity 50 so as to come to rest behind the overhanging lip 54 as shown in FIG. 3. At this time, the weatherseal 44 has been engaged with the base 46 and the fabric door 10 has been stretched into two sections, a first section from the header to the button and keyhole latch engagements and a second section from the button and keyhole engagements to the bead and groove engagement 40.

It should of course be readily apparent that the engagement effectuated between the overhanging lip 54 and the stud or roller 66 is not in and of itself sufficient for securing the cargo container. Shifting cargo imparting forces onto the fabric door 10 could readily cause the stud or roller 66 to rock out of the recess 50. For this reason, a third latch is provided with the structure of the invention to complete the total latching system. As can be seen in FIG. 4, a slide latch assembly 70 is appropriately affixed to the lower beam 42 by means of screws or rivets 71. The slide latch assembly comprises a slide 72 slidingly received within the housing of the assembly and making locking engagement with a stud 74 fixedly attached to a vertical beam 76 which may also have studs thereon for engagement with the upper door beam 12. The vertical beam is connected to the base 46 of the cargo container and to the header thereof. Of course, it should be readily appreciated that if a beam running the heighth of the cargo container is not desirable then the beam 76 may be replaced by a bracket fixedly attached to the base 46, the bracket having the stud 74 appropriately attached thereto. Preferably, to guarantee the retention of the engagement of the stud 66 within the recess 50, latching engagement by means of the slide latch assembly 70 is provided by means of two such latch assemblies positioned in close proximity with the stud and cavity latch 66,50. It is contemplated that the slide latch assemblies 70 would be positioned 20% of the distance between the stud-cavity latches from each of said latches. While the slide latch assemblies 70 may be of any suitable nature, it is preferred that they be of such construction as taught by the U.S. patent application Ser. No. 201,590 filed Oct. 27, 1971 and now U.S. Pat. No. 3,752,520.

An alternate approach for achieving the final latching achieved by the slide latch assembly 70 is shown in FIGS. 7 and 8. Here it can be seen that an elastic strap 80 is fixedly secured to the lower beam 42 by means of a bolt or other securing means 82. As can best be seen from FIG. 8, the lower beam 81 in this instance comprises a closed channel member having a cutout portion 84 present at that point where the latching engagement is to be made. A slide 86 having a keyhole 88 passing therethrough is attached to an end of the elastic strap 80. The slide 86 has a handle 90 bent outwardly and to the left as shown in FIG. 7. The bent handle 90 provides a means for gripping the slide 86 and for restraining the slide from passing beyond the edge 92 of the cutout portion 84 of the lower beam 81.

There is again provided a vertical beam 76 having a stud 74 fixedly attached thereto. Again, a bracket could be used in place of the vertical beam 76 for retaining the stud 74. In any such case, once the roller-cavity engagement has been made at 50,66, secured latching engagement may be made by the operator by seizing the handle 90, pulling the slide 86 against the bias presented by the elastic strap 80 so as to place the keyhole 88 over the stud 74 and then releasing the slide 86 so that the natural bias of the elastic strap 80 will force a stud and keyhole engagement at 74,88 in the well known fashion. It should of course be understood that there would be two such elastic strap slide latch assemblies associated with the bottom beam 81; one such latch assembly associated with each of the roller and cavity latches 50,66.

Thus it can be seen that the objects of the invention have been achieved by presenting a latching system which comprises a first set of button and keyhole latches simultaneously actuated by movement of an upper beam, a set of roller and cavity latches at each of the lower corners of the opening of the cargo container actuated simultaneously by appropriate movement of a lower beam, and a set of slide latches actuated for securing and maintaining the engagement made by the roller and cavity latch assemblies. The latch system of the instant invention alleviates the multiplicity of latching operations which have heretofore been required for securing fabric doors on cargo containers.

While in accordance with the Patent Statutes only the best mode and preferred embodiment of the invention have been presented and described in detail, it is to be understood that the invention is not limited thereto or thereby. Consequently, for an appreciation of the contemplated scope of the invention reference should be had to the accompanying claims.

What is claimed is:

1. A latch system for use on a cargo container having a frame work, base, and a fabric door for closing an opening allowing access to the interior thereof, comprising:
    a first rigid member connected to and horizontally traversing the fabric door and dividing the door into at least two sections;
    a plurality of first latch assemblies connected to and spaced along the first rigid member;
    a second rigid member connected to and horizontally traversing the fabric door at the bottom thereof; and
    a plurality of second and third latch assemblies connected to the second rigid member, the second latch assemblies securing the positioning of the fabric door over the opening and the third latch assemblies, separate and distinct from the second latch assemblies and interposed therebetween, maintaining the engagement of the second latch assemblies.

2. A latch system as recited in claim 1 wherein the first latch assemblies comprise a plurality of key hole plates fixedly secured to the first rigid member, the fabric door being interposed and secured between the plates and the first rigid member.

3. A latch system as recited in claim 1 wherein the second latch assemblies are connected to each end of the rigid member, each comprising a tongue engaged with a groove, the groove being within a plate fixedly attached to the base of the cargo container.

4. A latch system as recited in claim 3 wherein the tongue has attached to the end thereof a roller for making rolling engagement within the groove.

5. A latch assembly as recited in claim 3 wherein the third latch assemblies comprise slide latch mechanisms positioned between the second latch assemblies and making latching engagement with studs fixedly attached to the framework of the container.

6. A latch system as recited in claim 3 wherein each of the third latch assemblies comprises an elastic strap connected to the second rigid member and a slide fixedly attached to the elastic strap and having a keyhole slot therein.

7. A cargo container latch system for use on a cargo container having a base, framework, and fabric door covering an opening to the interior of the container, comprising:
    a first beam horizontally traversing the fabric door;
    a plurality of first latches spaced along and connected to the first beam;
    a second beam connected to and traversing the bottom of the fabric door and making sealing engagement with the base of the cargo container;
    a tongue and groove latch assembly connected to each end of the second beam and fixing engagement of the second beam with the framework; and
    slide latch assemblies interposed between the tongue and groove latches and maintaining engagement of the tongue and groove latch assemblies.

8. The cargo container latch system as recited in claim 7 wherein each slide latch assembly comprises an elastic strap fixed to the second beam and a slide having a keyhole slot therein fixed to the elastic strap, the slide having a handle protruding therefrom for restricting movement of the slide by engagement with the first beam.

9. The cargo container latch system as recited in claim 7 wherein the tongue and groove latch assemblies include a tongue having a roller connected to the end thereof.

10. The cargo container latch system as recited in claim 7 wherein the cargo container has a plurality of studs extending flush with the opening in horizontal spaced relationship and wherein the first latches are similarly spaced along the first beam, the first latches being keyhole latches such that actuation of all such keyhole latches with the extending studs may be simultaneously achieved.

* * * * *